United States Patent
Cheon et al.

(10) Patent No.: US 11,451,977 B2
(45) Date of Patent: Sep. 20, 2022

(54) ELECTRONIC DEVICE INCLUDING ANTENNA DEVICE

(71) Applicant: Samsung Electronics Co., Ltd., Suwon-si (KR)

(72) Inventors: Seyoon Cheon, Suwon-si (KR); Jehun Jong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 16/960,044

(22) PCT Filed: Dec. 20, 2018

(86) PCT No.: PCT/KR2018/016319
§ 371 (c)(1),
(2) Date: Jul. 3, 2020

(87) PCT Pub. No.: WO2019/135521
PCT Pub. Date: Jul. 11, 2019

(65) Prior Publication Data
US 2021/0058800 A1 Feb. 25, 2021

(30) Foreign Application Priority Data
Jan. 4, 2018 (KR) .......................... 10-2018-0001268

(51) Int. Cl.
*H04W 16/30* (2009.01)
*H01Q 1/24* (2006.01)
(Continued)

(52) U.S. Cl.
CPC ............ *H04W 16/30* (2013.01); *H01Q 1/246* (2013.01); *H01Q 1/48* (2013.01); *H01Q 25/00* (2013.01)

(58) Field of Classification Search
CPC ......... H04W 16/30; H01Q 1/246; H01Q 1/48; H01Q 25/00; H01Q 1/243; H01Q 21/065; H01Q 19/005; H01Q 1/38
See application file for complete search history.

(56) References Cited

U.S. PATENT DOCUMENTS 7,319,429 B2    1/2008   Chang et al.
7,548,217 B2    6/2009   Chang
(Continued)

FOREIGN PATENT DOCUMENTS

JP    2014-171095 A    9/2014
JP    2014-179680 A    9/2014
(Continued)

OTHER PUBLICATIONS

International Search Report dated Apr. 3, 2019 in connection with International Patent Application No. PCT/KR2018/016319, 2 pages.

*Primary Examiner* — Fred A Casca

(57) ABSTRACT

An electronic device may include a wireless communication circuitry, an antenna device to transmit or receive a signal associated with an operation of the wireless communication circuitry. The antenna device may include a ground layer, at least one antenna radiator disposed at an upper portion of the ground layer, a first cell layer in which a plurality of conductive cells having a first size and shape are repeatedly disposed, with a specific distance, at a peripheral portion of the at least one antenna radiator, and a second cell layer in which a plurality of conductive cells having a second size and shape are disposed with a specific distance at a lower portion of the first cell layer and at the peripheral portion of the at least one antenna radiator. Moreover, various embodiment found through the disclosure are possible.

8 Claims, 16 Drawing Sheets

(51) Int. Cl.
*H01Q 1/48* (2006.01)
*H01Q 25/00* (2006.01)

(56) References Cited

U.S. PATENT DOCUMENTS

| | | |
|---|---|---|
| 8,525,739 B2 | 9/2013 | Lee et al. |
| 9,692,132 B2 | 6/2017 | Kawaguchi et al. |
| 2007/0090998 A1 | 4/2007 | Chang et al. |
| 2009/0115680 A1 | 5/2009 | Chang |
| 2017/0250475 A1* | 8/2017 | Liu ................. H01Q 21/30 |

FOREIGN PATENT DOCUMENTS

| | | |
|---|---|---|
| KR | 10-2011-0062100 A | 6/2011 |
| KR | 10-2017-0094740 A | 8/2017 |
| KR | 10-1766216 B1 | 8/2017 |

* cited by examiner

ELECTRONIC DEVICE INCLUDING ANTENNA DEVICE

CROSS-REFERENCE TO RELATED APPLICATIONS

This application is a 371 of International Application No. PCT/KR2018/016319 filed on Dec. 20, 2018, which claims priority to Korean Patent Application No. 10-2018-0001268 filed on Jan. 4, 2018, the disclosures of which are herein incorporated by reference in their entirety.

BACKGROUND

1. Field

Embodiments disclosed in the disclosure relate to a structure of an antenna device included in an electronic device.

2. Description of Related Art

With the rapid increase in mobile traffic, next-generation communication technologies based on an ultra-high-bandwidth frequency of 20 GHz or more (e.g., 5G (generation) or wireless gigabit alliance (WiGig)) have been developed. A signal having the ultra-high-bandwidth frequency signal includes a millimeter wave having a frequency band of 20 GHz to 300 GHz. When the ultra-high-bandwidth frequency is used, because a wavelength is short, smaller and more light antennas and devices may be implemented. As the ultra-high-bandwidth frequency is used, more many antennas may be mounted in the same area due to the short wavelength, but the straightness of a radio wave becomes strong, and the loss in a propagation path severely occurs. Accordingly, the characteristic of the radio wave may be degraded. Accordingly, there has been used a technology of enhancing the transmission/reception efficiency of the antenna by concentrating transmit/receive power into a narrower space.

The increase in transmit power in the high-frequency communication increases a data throughput and a communication coverage, so it is necessary to ensure the technology of increasing a transmit gain through a patch antenna array.

The disclosure is to provide an electronic device capable of improving signal transmission performance without increasing the transmit power, and of increasing the transmit power under the same power feeding environment as before to increase the coverage and the data throughput.

SUMMARY

According to an embodiment disclosed in the disclosure, an electronic device may include a housing including a first plate, a second plate facing away from the first plate, and a side member surrounding a space between the first plate and the second plate, an antenna assembly including a plurality of planes disposed in parallel to the second plate, stacked on each other, and including a first plane interposed between the first plate and the second plate, a second plane interposed between the first plane and the first plate, and a third plane interposed between the second plane and the first plate, a first conductive plate disposed in parallel to the planes and interposed between the first plane and the first plate within a first area when viewed from above the second plate, conductive islands having a first repeating pattern and disposed on the first plane within a second area surrounding the first area, when viewed from above the second plate, conductive islands disposed on the second plane within the second area, and having a second repeating pattern partially overlapped with the first repeating pattern, when viewed from above the second plate, conductive islands disposed on the third plane within the second area, and having a third repeating pattern partially overlapped with the second repeating pattern, when viewed from above the second plate, and a wireless communication circuitry disposed in the space, electrically connected with the first conductive plate, and configured to supply a signal having a frequency range of 3 GHz to 300 GHz.

According to various embodiments of the disclosure, at least one antenna radiator is disposed on at least one layer of a front layer or a rear layer of the plurality of layers, in which the plurality of conductive cells are arranged, or the same layer as the plurality of layers, thereby enhancing the performance of the antenna.

Besides, a variety of effects directly or indirectly understood through the disclosure may be provided.

BRIEF DESCRIPTION OF THE DRAWINGS

In the following description made with respect to the accompanying drawings, similar components will be assigned with similar reference numerals.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
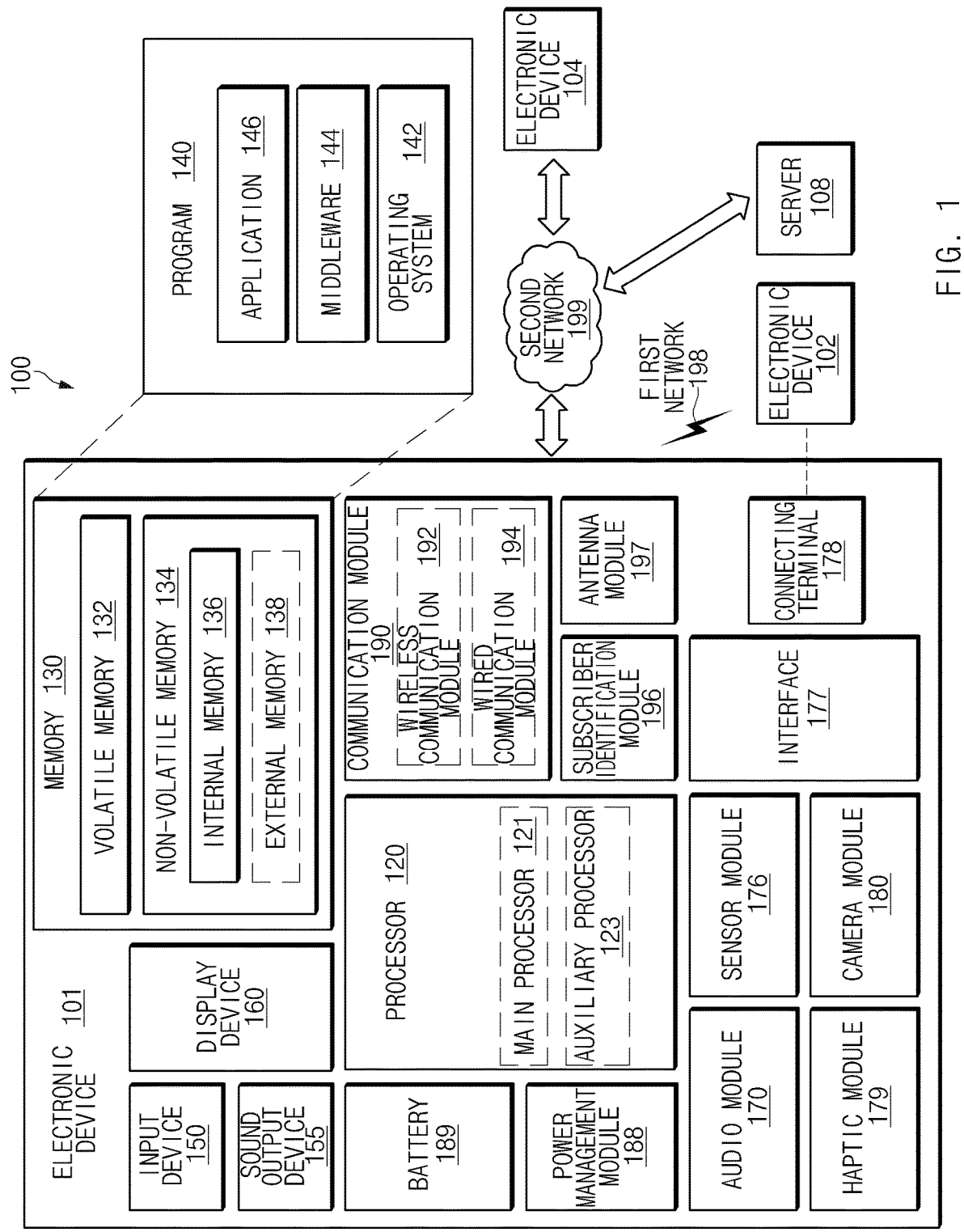
FIG. 1 is a block diagram of an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
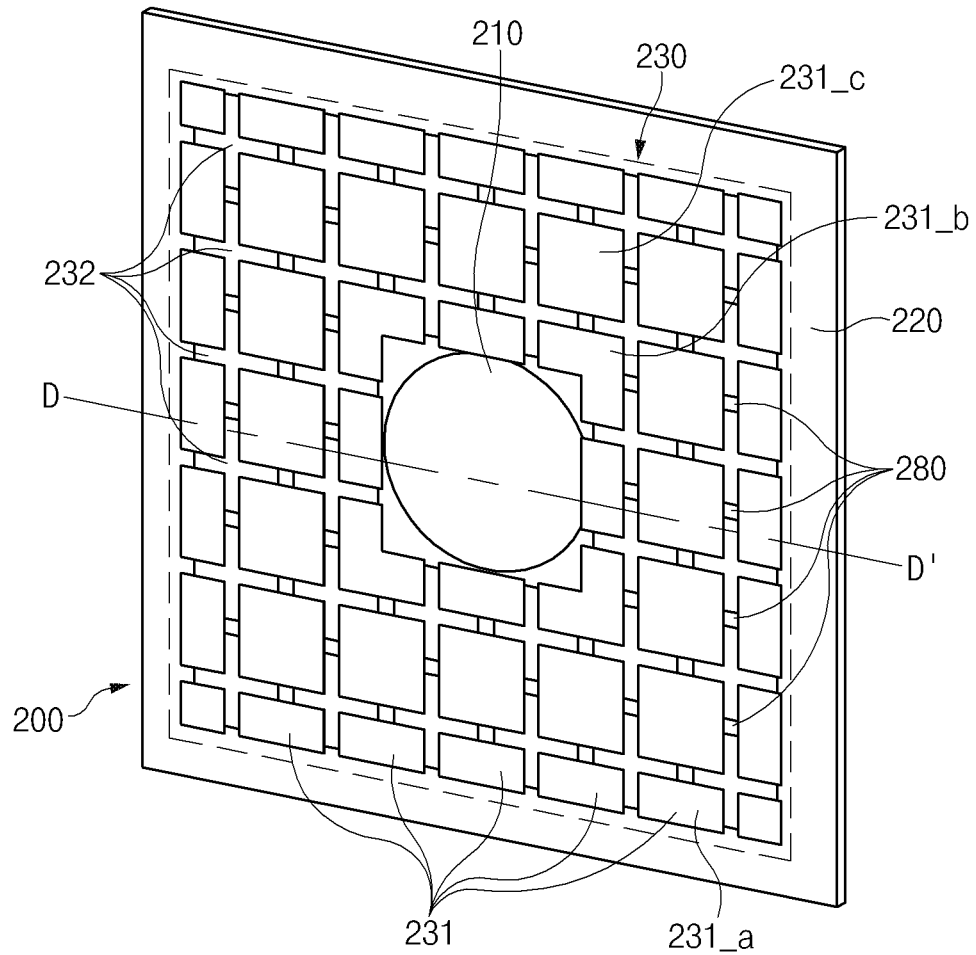
FIG. 2A is a perspective view schematically illustrating some components of an antenna device included in an electronic device according to an embodiment.
Figure 2B:
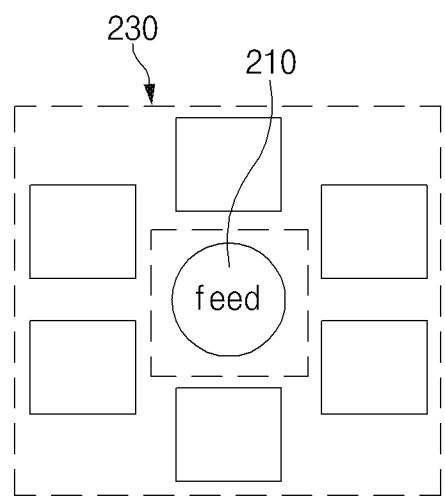
FIG. 2B is a perspective view schematically illustrating another example of some components of an antenna device included in an electronic device according to an embodiment.
Figure 3:
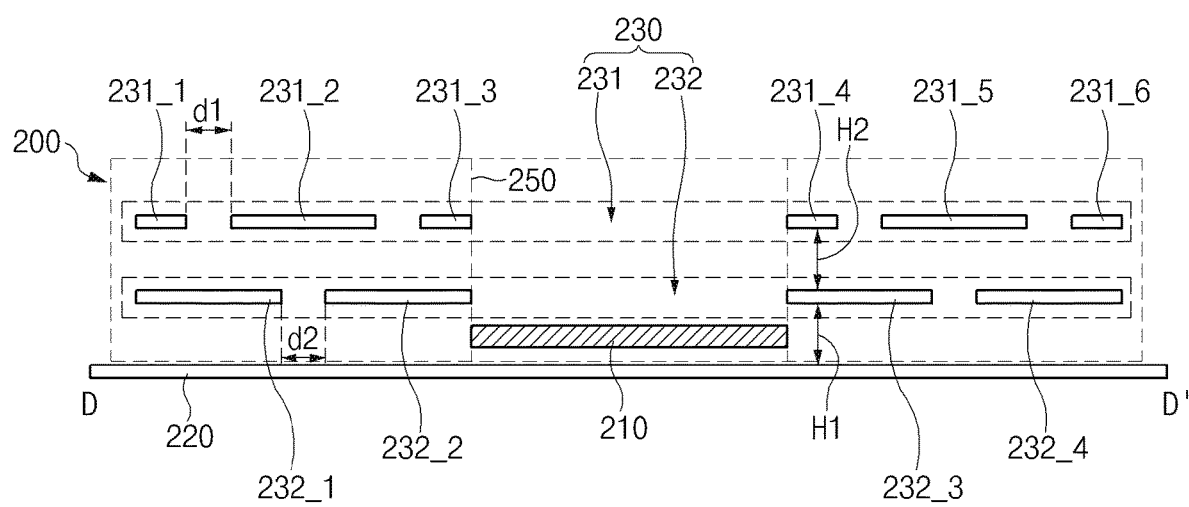
FIG. 3 is a sectional view illustrating some components of an antenna device taken along line D-D' of FIG. 2A.

FIG. 2A is a perspective view schematically illustrating some components of an antenna device included in an electronic device according to an embodiment, FIG. 2B is a view illustrating another example of some components of an antenna device included in an electronic device, and FIG. 3 is a sectional view illustrating some components of an antenna device taken along line D-D' of FIG. 2A.

Referring to FIG. 2A to 3, according to an embodiment, an antenna device 200 may include an antenna radiator 210, a ground layer 220, and a plurality of conductive cells 230. In addition, the antenna device 200 may further include a power feeding part to supply power to the antenna radiator 210 and a communication circuitry to supply a signal to the power feeding part.

The antenna radiator 210 may be disposed at an upper portion of the ground layer 220, and the plurality of conductive cells 230 may be disposed at a peripheral portion of the antenna radiator 210. An insulating layer or a dielectric layer may be interposed between the antenna radiator 210 and the ground layer 220. The antenna radiator 210 may be provided in a patch form. Although FIG. 2 illustrates that each antenna radiator 210 is provided in the form of a circular patch, the disclosure is not limited. The antenna radiator 210 may be provided in the form of a rectangular patch or various forms. The position of the antenna radiator 210 may be variously provided. For example, the antenna radiator 210 may be disposed in the same layer as a first cell layer 231 or a second cell layer 232 of the plurality of conductive cells 230. Alternatively, the antenna radiator 210 may be disposed under the second cell layer 232. Alternatively, the antenna radiator 210 may be disposed in a layer between the first cell layer 231 and the second cell layer 232, and may be disposed at a position higher than the first cell layer 231. A position to dispose the antenna radiator 210 may be variously determined depending on a target frequency band or frequency characteristic.

The ground layer (or the ground plane) 220 may be formed in a plate shape. The ground layer 220 may include a plurality of structures. The ground layer 220 may be disposed under the antenna radiator 210. The ground layer 220 may include a metallic material to serve as the ground of the antenna radiator 210. The ground layer 220 may be disposed in parallel to the antenna radiator 210. The first height 'H1' between the ground layer 220 and the second cell layer 232 may be formed to be equal to the second height 'H2' between the second cell layer 232 and the first cell layer 231.

The plurality of conductive cells (or conductive islands) 230 may include the first cell layer 231 and the second cell layer 232. A plurality of conductive cells having a first size and a first shape may be disposed in the first cell layer 231. A plurality of conductive cells having a second size and a second shape may be disposed in the second cell layer 232. The first size and the first shape may be provided to be the same as or different from the second size and the second shape. Referring to drawings, the first cell layer 231 may include conductive cells 231_a having a rectangle shape to be disposed at an edge, conductive cells 231_b having a 'L' shape to be disposed at a corner part while surrounding the antenna radiator 210, and conductive cells 231_c having a square shape to be disposed between the edge and the antenna radiator 210. Additionally or substantially, conductive cells, which are disposed at a corner area, of the conductive cells disposed at the edge of the first cell layer 231 may be provided in a square shape. Conductive cells, which are disposed at the center of the edge, of the conductive cells to surround the antenna radiator 210 may be provided in a rectangle shape. The distance between the conductive cells disposed in the first cell layer 231 may be uniformly provided as a first distance 'd1'. According to various embodiments, as illustrated in FIG. 2B, the plurality of conductive cells 230 may be all provided in the same shape.

The conductive cells having the square shape may be uniformly provided with the second distance 'd2' in the second cell layer 232. The second gap 'd2' may be provided to be equal to or different from the first distance 'd1'. A portion of the first distance 'd1' and a portion of the second distance 'd2' are provided to be partially overlapped with each other, so at least one opening 280 may be provided in an area, in which the plurality of conductive cells 230 are disposed, such that at least a portion of the ground layer 220 is exposed to the outside. The at least one opening 280 may be filled with an insulating material.

The first cell layer 231 may include an 11$^{th}$ conductive cell 231_1, a 12$^{th}$ conductive cell 231_2, and a 13$^{th}$ conductive cell 231_3, which are provided at the left side, and a 14$^{th}$ conductive cell 231_4, a 15$^{th}$ conductive cell 231_5, and a 16$^{th}$ conductive cell 231_6 which are provided at the right side, based on the antenna radiator 210. The second cell layer 232 may include a 21$^{st}$ conductive cell 232_1, and a 22$^{nd}$ conductive cell 232_2, which are provided at the left side, and a 24th conductive cell 232_4, a 25$^{th}$ conductive cell 232_5 which are provided at the right side, based on the antenna radiator 210. The 11$^{th}$ conductive cell 231_1 and the 12$^{th}$ conductive cell 231_2 may be arranged side by side with the first distance 'd1'. The 12$^{th}$ conductive cell 231_2 and the 13$^{th}$ conductive cell 231_3 may be arranged side by side with the first distance. The 21st conductive cell 232_1 and the 22$^{nd}$ conductive cell 232_2 may be arranged side by side with the second distance 'd2'. The 22nd conductive cell 232_2 and the 23$^{rd}$ conductive cell 232_3 may be arranged side by side with a third distance (a distance corresponding to the length of the antenna radiator).

A dielectric material (or insulating material) may be disposed between the first cell layer 231 and the second cell layer 232 and between the second cell layer 232 and the ground layer 220. The dielectric layer (or the insulating layer) may be disposed even at an upper portion of the first cell layer 231. The dielectric layer may be disposed even at an upper portion of the antenna radiator 210. The plurality of conductive cells 230 may be printed on, for example, a top surface of a substrate 250 or may be formed by etching a conductive layer positioned on the top surface of the substrate 250.

In the above-described antenna device 200, metal structures (e.g., the plurality of conductive cells 230), which are regularly arranged in each layer, serve as a reflective plate, a reflected wave from the ground surface (e.g., the ground layer) and electromagnetic waves radiated through side surfaces of the antenna radiator are changed in terms of phase whenever meeting on the reflective plate, and are reflected in several layers until meeting gaps (e.g., the openings 280) open between structures to be radiated. Accordingly, antenna radiation performance may be improved by designing a structure in which the antenna device 200 may adjust the phases of electromagnetic waves radiated from a peripheral portion of the antenna radiator while the phases of the electromagnetic waves, which are irradiated in a direction other than an upper portion (or the Z axis) of the antenna radiator, have the same phases as the electromagnetic waves directly irradiated from the antenna radiator or the radiation characteristic of the electromagnetic waves is assisted. In addition, the plurality of conductive cells are provided in a plurality of layers to ensure additional stiffness of the antenna device 200, thereby providing stiffness equal to or greater than that in the previous antenna design.

Figure 4:
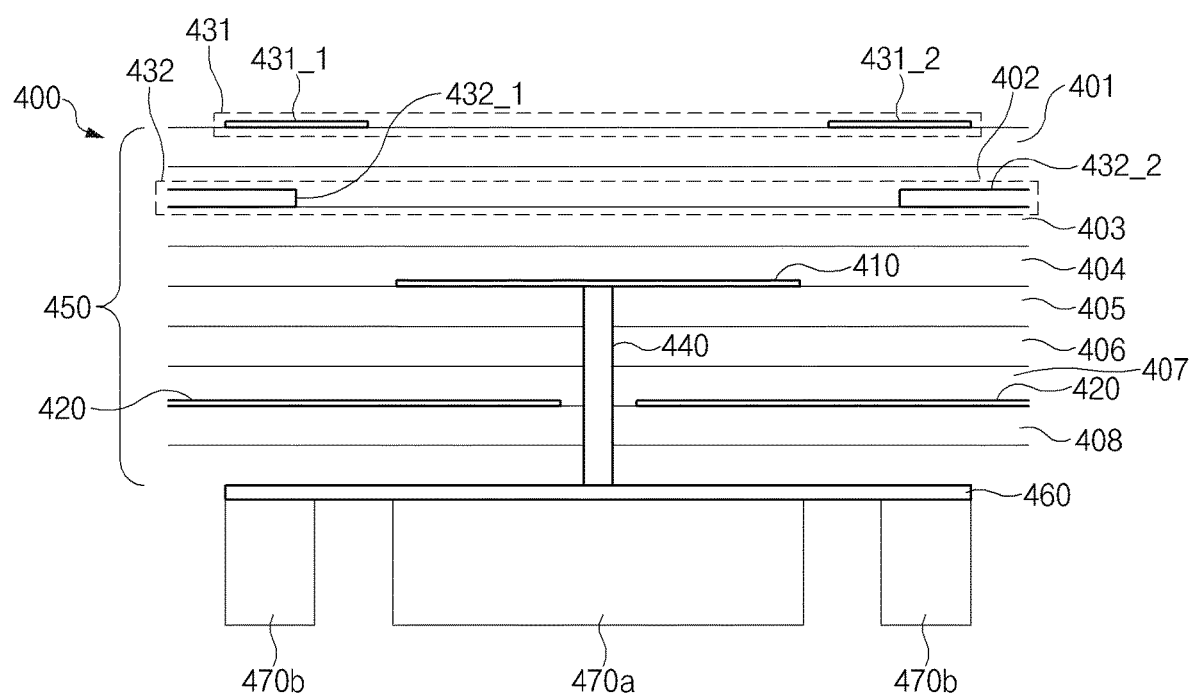
FIG. 4 is a sectional view schematically illustrating an antenna device included in an electronic device according to an embodiment.

FIG. 4 is a sectional view schematically illustrating an antenna device included in an electronic device, according to an embodiment.

Referring to FIG. 4, an antenna device (e.g., some components of the antenna device 200 of FIG. 2) 400 may include an antenna radiator 410, a substrate 450 having a plurality of conductive cells 431_1, 431_2, 432_1, and 432_2 included in a plurality of cell layers 431 and 432, a power feeding part 440 to supply a communication signal to the antenna radiator 410 of the substrate 450, and a communication circuitry 470a to transmit the communication signal through the feeding. In addition, the antenna device 400 may further include a power member 470b (e.g., PMIC) to supply power to the communication circuitry 470a.

The substrate may be formed in a plate shape. For example, the substrate 450 may be formed of a material having the relative permittivity of about 3.5. The substrate 450 may be formed with a plurality of layers.

The substrate 450 may include a plurality of layers. The plurality of cells 431_1 and 431_2 included in a first cell layer may be, for example, disposed on a first layer 401 of the substrate 450, that is, on the top surface of the substrate 450. The plurality of cells 432_1 and 432_2 included in a second cell layer may be, for example, disposed on a third layer 403 of the substrate 450. The antenna radiator 410 may be disposed on a fifth layer 405 of the substrate 450, which is positioned under the first layer 401 of the substrate 450. A ground layer 420 may be, for example, disposed on the eighth layer 408 of the substrate 450, which is positioned under the fifth layer 405 of the substrate 450. A power feeding network layer 460 may be disposed on the bottom surface of the substrate 450. The power feeding part 440 (or the power feeding line) may electrically connect the antenna radiator 410 with the power feeding network layer 460. The power feeding network layer 460 may be electrically connected with the communication circuitry 470a. According to various embodiments, the antenna device 400 may be directly connected with the communication circuitry 470a without a separate feeding network layer 460, or may be routed at the bottom of the printed circuit board if necessary.

The communication circuitry 470a may include, for example, an RFIC 470a. The communication circuitry 470a is integrally implemented with the power feeding network layer 460 or may be disposed to close to the power feeding network layer 460. The substrate 450 may support the antenna radiator 410, the ground layer 420, the plurality of conductive cells 431_1, 431_2, 432_1, and 432_2, and the plurality of power feeding parts 440 (or power feeding lines). The substrate 450 may be, for example, a printed circuit board (PCB).

The resonance frequency of the antenna radiator 410 may be varied depending on the distance between the antenna radiator 410 and the ground layer 420 and the distance between the antenna radiator 410 and the conductive cells 431_1, 431_2, 432_1, and 432_2 included in the cell layers 431 and 432. The resonance frequency of the antenna radiator 410 may be adjusted by changing the layer, in which the antenna radiator 410 is disposed, of the substrate 450.

In the above-described structure of the antenna device 400, an upper portion of the ground layer 420 may be classified as an RF layer (e.g., an antenna-related layer), and a lower portion of the ground layer 420 may be classified as a baseband layer (e.g., a layer at which the communication module is disposed).

Figure 5A:
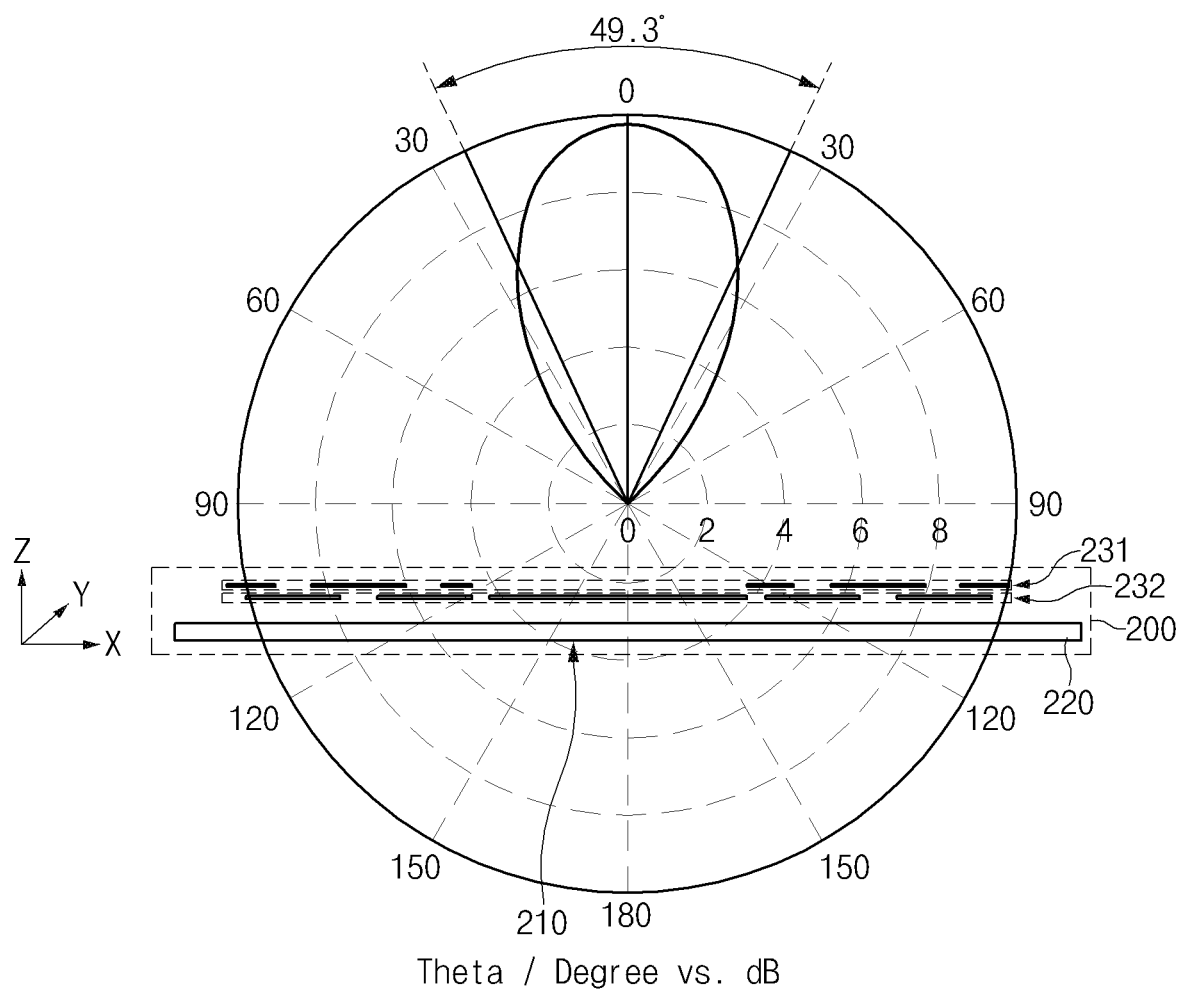
FIG. 5A is a graph illustrating a gain based on a direction of an antenna device included in an electronic device according to an embodiment.

FIG. 5A is a graph illustrating a gain based on a direction of an antenna device included in an electronic device according to an embodiment.

According to an embodiment, the antenna device (e.g., the antenna device 200 of FIG. 2 or the antenna device 400 of FIG. 4) may include the first cell layer 231 and the second cell layer 232, and the antenna radiator 210 may be disposed at the center of the upper portion of the ground layer 220.

The antenna device may emit a signal in the Z-axis direction, that is, upward from the antenna device 200. The gain of the antenna device 200 in the Z-axis direction may be about 9.72 dB. The resonance frequency characteristic may be, for example, 31.5 GHz, the main lobe direction may exhibit 0.0 degrees and an angular width (3 dB) may represent the characteristic of 49.3 degrees. As described above, according to an embodiment, it may be understood that the antenna devices 200 and 400 have a higher gain of 9.0 dB or more in the Z-axis direction, exhibit the resonance frequency characteristic of 30 GHz or more (or the frequency characteristic may be adjusted to be in the range 20 to 300 GHz by adjusting a conductive cell width and the spacing between the conductive cells or an electrical characteristic such as the number of permittivity layers in the substrate), and exhibit an excellent characteristic in concentration characteristic (angle width).

Figure 5B:
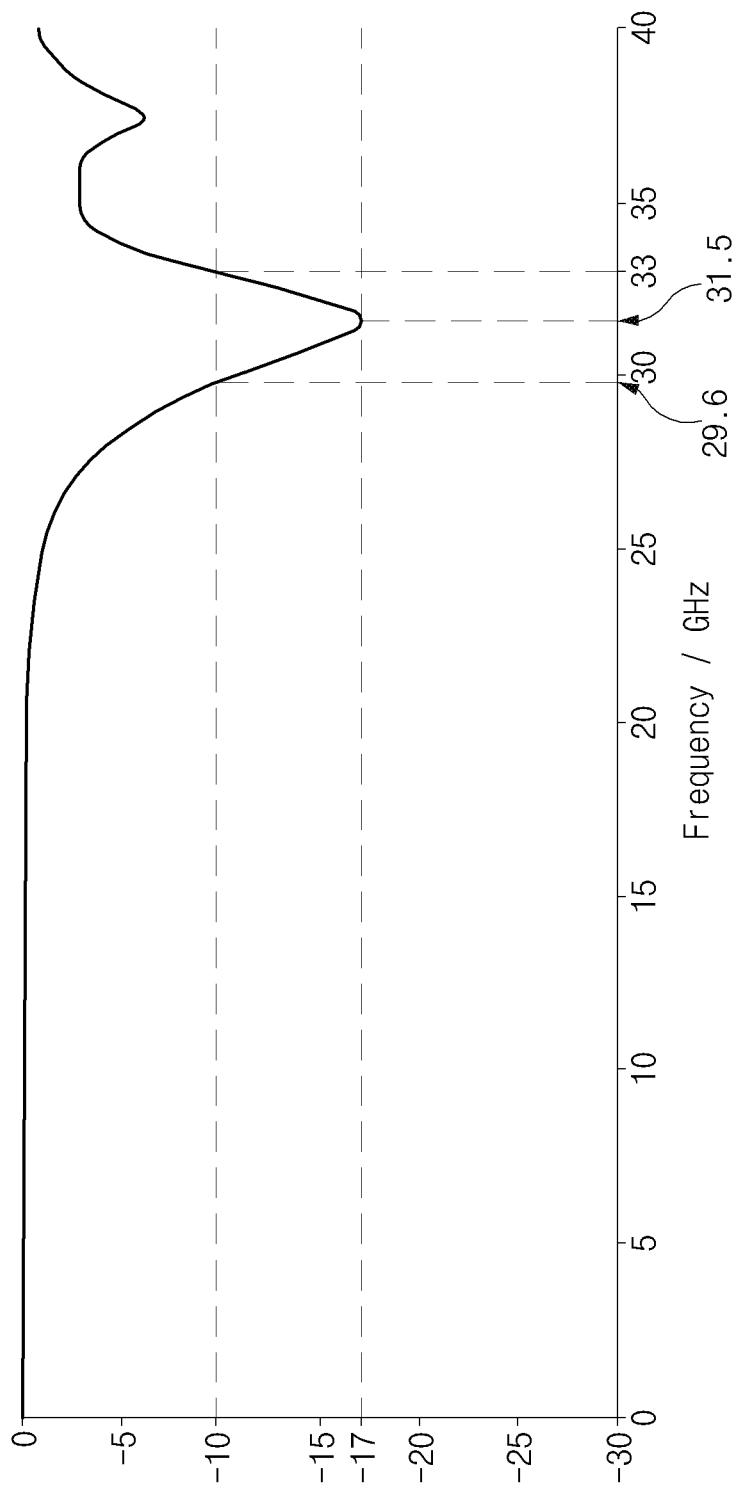
FIG. 5B is a view illustrating a resonance frequency characteristic of an antenna device included in an electronic device according to an embodiment.

FIG. 5B is a view illustrating a resonance frequency characteristic of an antenna device included in an electronic device according to an embodiment.

Referring to FIG. 5B, according to an embodiment, the reflection coefficient of the antenna device (e.g., the antenna device 200 of FIG. 2 or the antenna device 400 of FIG. 4) may be less than −10 dB at about 29.6 GHz to about 33 GHz. At 31.5 GHz, the reflection coefficients of the antenna devices 200 and 400 may be about −17 dB, and the peak gain of the antenna devices 200 may be about 9.72 dB. According to the embodiment, the antenna device may provide excellent frequency characteristics by exhibiting resonance frequency characteristics concentrated in the band of 29 to 35 GHz.

Figure 6:
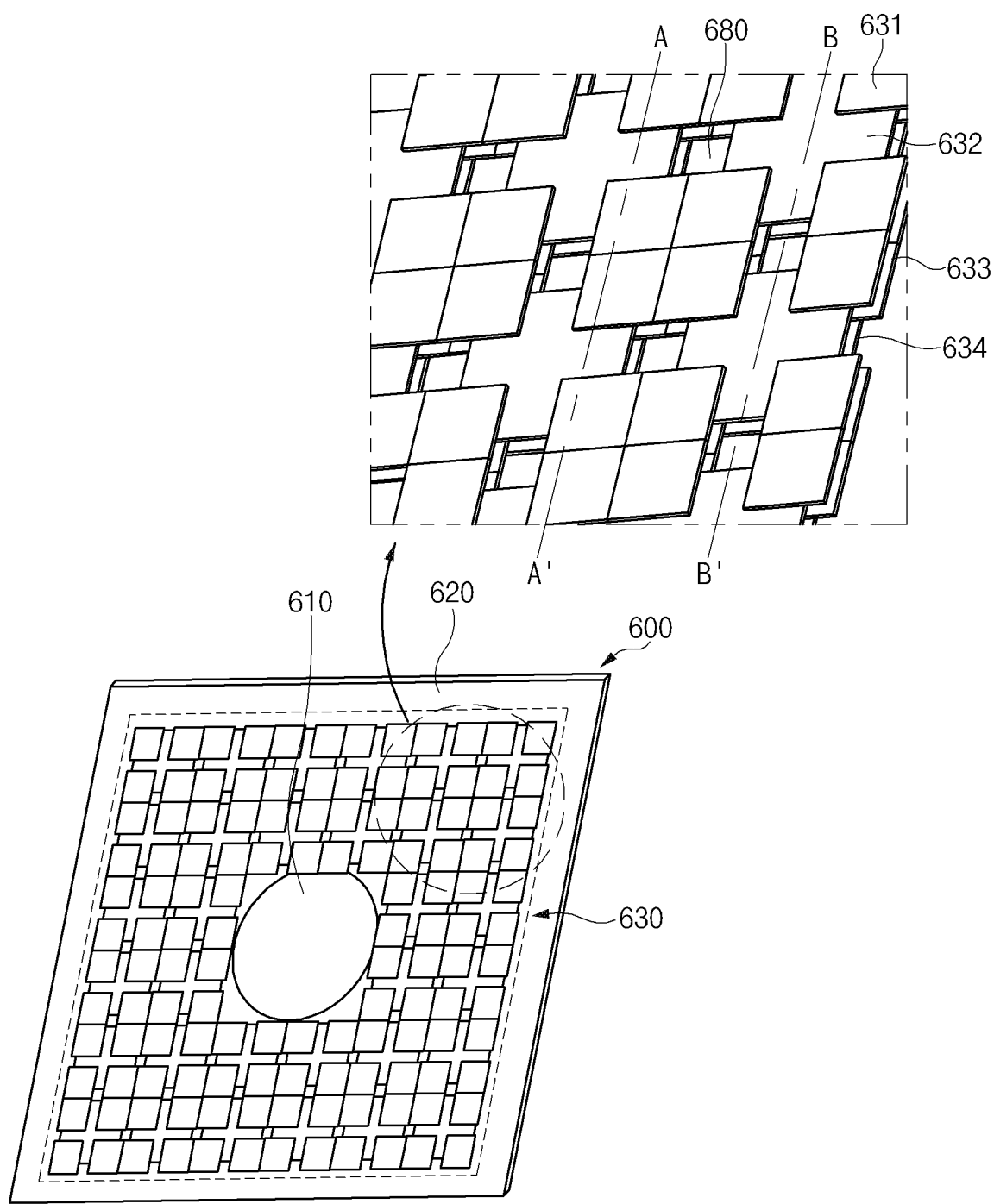
FIG. 6 is a perspective view illustrating another example of an antenna device according to various embodiments.

FIG. 6 is a perspective view illustrating another example of an antenna device according to various embodiments;

Referring to FIG. 6, according to an embodiment, an antenna device 600 may include an antenna radiator 610, a ground layer 620, and a plurality of conductive cells 630. In addition, the antenna device 600 may further include a power feeding part to supply power to the antenna radiator 610 and a communication circuitry to supply a signal to the power feeding part.

The antenna radiator 610 may be disposed at the upper portion of the ground layer 620, and at least some of the plurality of conductive cells 630 may be disposed at a peripheral portion. The antenna radiator 610 may be provided in a patch form. Although FIG. 6 illustrates that each antenna radiator 610 is provided in the form of a circular patch, the disclosure is not limited. The antenna radiator 610 may be provided in the form of a rectangular patch or in various forms. The antenna radiator 610 may be disposed at the center of the ground layer 620.

The ground layer (or ground plane) 620 may be formed in a plate shape as described above with reference to FIG. 2. The ground layer 620 may include a plurality of structures. The ground layer 620 may be disposed under the antenna radiator 610. The ground layer 620 may include a metallic material to serve as the ground of the antenna radiator 610.

The plurality of conductive cells (or conductive islands) 630 may include a first cell layer 631, a second cell layer 632, a third cell layer 633, and a fourth cell layer 634. In the plurality of conductive cells 630, for example, metallic cells having a specific size may be disposed with a specific distance on the same layer with respect to each cell layer. The plurality of conductive cells 630 may all be formed in the same shape and size. Alternatively, a plurality of conductive cells having a first size and a first shape may be disposed in the first cell layer 631, and a plurality of conductive cells having a second size and a second shape may be disposed in the second cell layer 632. A plurality of conductive cells having the first size and the first shape may be disposed in the third cell layer 633, and a plurality of conductive cells having the second size and the second shape may be disposed in the fourth cell layer 634.

The first size and shape, the second size and shape, the third size and shape, and the fourth size and shape may all be provided to be different from each other. In addition, cells disposed in two cell layers (e.g., in the first cell layer 631 and the second cell layer 632, in the second cell layer 632 and the third cell layer 633, in the third cell layer 633 and the fourth cell layer 634, between the fourth cell layer 634 and the first cell layer 631, or in the first cell layer 631 and the third cell layer 633) may have the same shape and the same size. In addition, the size and the shape of cells in one cell layer may be formed differently from the size and the shape of cells in remaining three cell layers. In addition, the plurality of conductive cells may all have the same size and shape. In addition, conductive cells may have an equal size and the same shape in the same layer or may have mutually different sizes and shapes in different layers. In addition, the distances among the conductive cells in the cell layers are equal, and the distances among different layers may be equal or different from each other.

In addition, as described above with reference to FIG. 2, although cells are arranged at the same side, the shapes of the cells may be differently provided depending on placing positions. For example, the shape of a cell disposed at a peripheral portion of the antenna radiator 610, the shape of a cell disposed at an edge, and the shape of a cell disposed at an intermediate position of a space between the antenna radiator 610 and the edge may be differently provided. According to an embodiment, the shape of the cell disposed at the intermediate position of a space between the antenna radiator 610 and the edge becomes a basic shape (e.g., the plate-shaped cell in the square shape described above with reference to FIG. 2), the cell disposed at the edge or the peripheral portion of the antenna radiator 610 may have a shape (the rectangular plate cell or L-shape plate cell illustrated in FIG. 2) obtained by cutting partially away the basic shape.

According to various embodiments, the first cell layer 631 and the third cell layer 633 may have the same arrangement state. The second cell layer 632 and the fourth cell layer 634 may have the same arrangement shape. As the first cell layer 631 is arranged to cross the second cell layer 632, and the third cell layer 633 is arranged to cross the fourth cell layer 634, an opening 680 may be provided such that the ground layer 620 is exposed to the outside (or the insulating layer or the dielectric layer to cover the ground layer 220 is exposed to the outside). A plurality of openings 680 may be provided as the plurality of conductive cells 630 are arranged to repeatedly cross each other.

Figure 7:
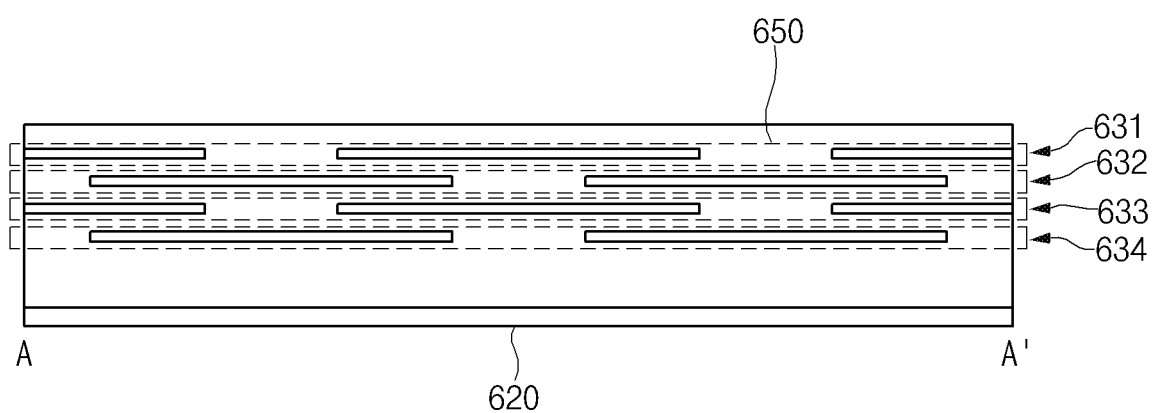
FIG. 7 is a view illustrating a surface cut taken along line A-A' of FIG. 6.
Figure 8:
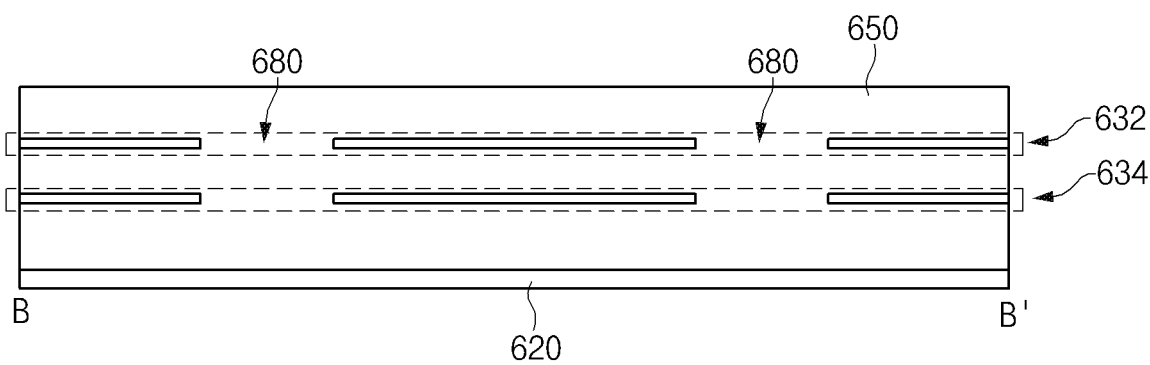
FIG. 8 is a view illustrating a surface cut taken along line B-B' of FIG. 6.

FIG. 7 is a view illustrating a surface cut taken along line A-A' of FIG. 6, and FIG. 8 is a view illustrating a surface cut taken along line B-B' of FIG. 6. In this case, FIG. 7 illustrates that the structure including the communication circuitry and the antenna radiator of FIG. 4 is employed as a basic structure, and four cell layers are additionally included.

Referring to FIG. 7, a substrate 650 may include a first cell layer 631, a second cell layer 632, a third cell layer 633, a fourth cell layer 634, and a ground layer 620. The first cell layer 631, the second cell layer 632, the third cell layer 633, and the fourth cell layer 634 are arranged in the same shape and size and distanced between the cells disposed in the same layer may be equal to each other. The ground layer 620 may be disposed under the first cell layer 631, the second cell layer 632, the third cell layer 633, and the fourth cell layer 634, and the dielectric material (or the insulating material) may form a layer between the ground layer 620 and the fourth cell layer 634, between the fourth cell layer 634 and the third cell layer 633, between the third cell layer 633 and the second cell layer 632, and between the second cell layer 632 and the first cell layer 631. A dielectric layer (or insulating layer) may also be formed on the first cell layer 631. The distances among the first cell layer 631, the second cell layer 632, the third cell layer 633, and the fourth cell layer 634 may be formed to be equal to each other. Although it is illustrated that the distance between the ground layer 620 and the fourth cell layer 634 is greater than another distance (e.g., the distance between the fourth cell layer 634 and the third cell layer 633), the disclosure is not limited thereto.

The antenna radiator 610 may be disposed, for example, at various positions. For example, the antenna radiator 610 may be disposed in the same layer as any one of the cell layers 631, 632, 633, and 634. Alternatively, the antenna radiator 610 may be disposed at a lower portion of the fourth cell layer. An insulating layer or a dielectric layer may be interposed between the antenna radiator 610 and the ground layer 620. According to various embodiments, the antenna radiator 610 may be disposed over the first cell layer 631.

Referring to FIG. 8, as illustrated along a cut part taken along line B-B' of FIG. 6, the substrate 650 corresponding to some component of the antenna device 600 may include a plurality of cell layers (e.g., 632 and 634) and the ground layer 620. The fourth cell layer 634 and the second cell layer 632 may be disposed at the upper portion of the ground layer 620. As the gap between cells disposed in the second cell layer 632 is, in the vertical direction, aligned with the gap between cells disposed in the fourth cell layer 634, the opening 680, which has been described above, may be provided. The at least one opening 680 may be substantially filled with a dielectric material (or insulating material, non-conductive material).

Figure 9:
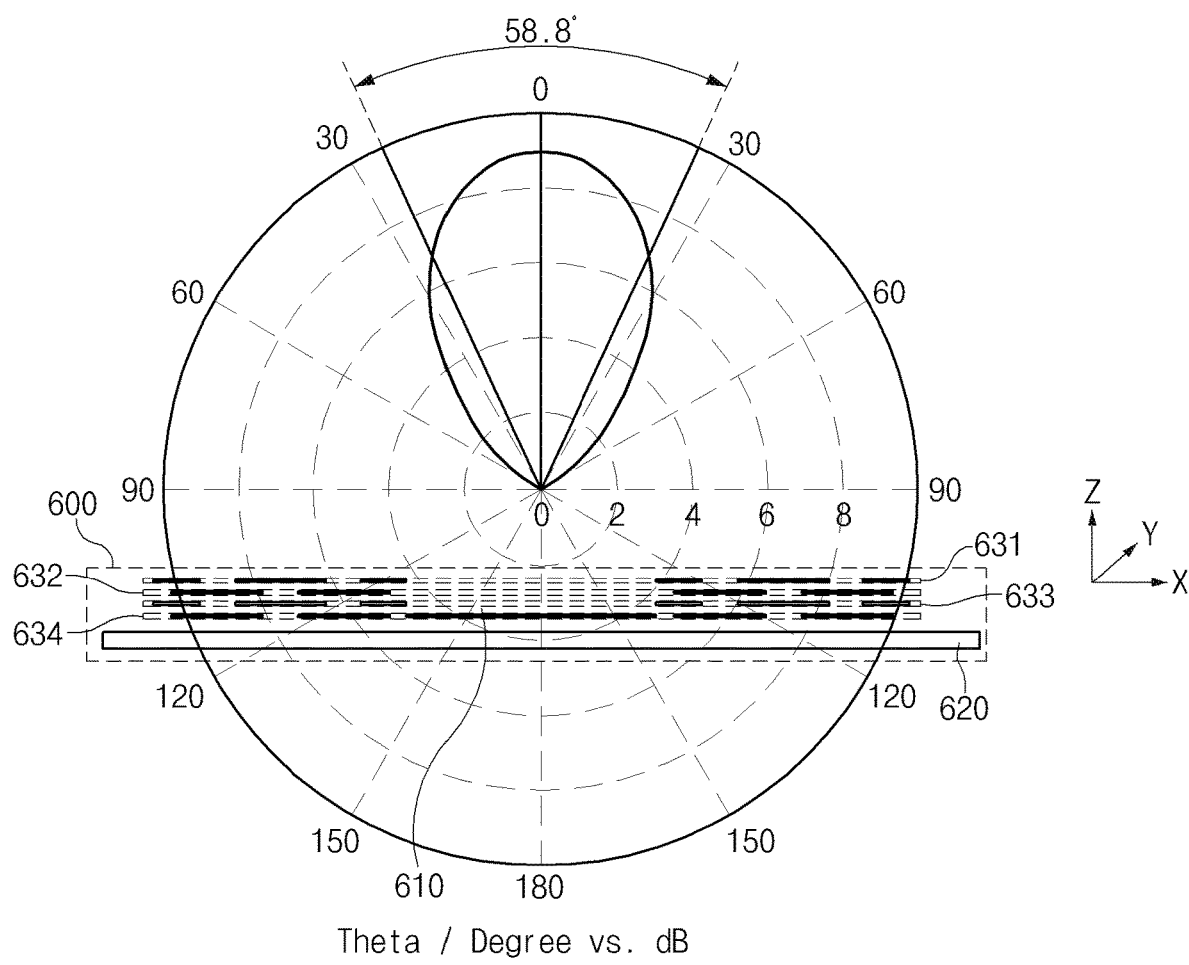
FIG. 9 is a graph illustrating a gain based on the direction of the antenna device illustrated in FIG. 6.

FIG. 9 is a graph illustrating a gain based on the direction of the antenna device illustrated in FIG. 6.

According to an embodiment, the antenna device (e.g., the antenna device 600 of FIG. 6) may include a plurality of conductive cell layers 631, 632, 633, and 634 disposed to surround the antenna radiator 610. The antenna radiator 610 may be disposed at the upper portion of the ground layer 620. The antenna device 600 may radiate a signal in the Z-axis direction, that is, upward from the antenna device 600. The gain (main lobe amplitude) of the antenna device 600 in the Z-axis direction may be 8.91 dB. The resonance frequency characteristic may be, for example, 31 GHz, the main lobe direction may exhibit 0.0 degrees and an angular width (3 dB) may represent the characteristic of 58.8 degrees. As described above, according to an embodiment, it may be understood that the antenna device 600 has a higher gain of 8.9 dB or more in the Z-axis direction, exhibits the resonance frequency characteristic of 30 GHz or more, and exhibits an excellent characteristic in concentration characteristic (angle width). The antenna device 600 described with reference to FIG. 6 has a gain smaller than a gain of the antenna device 200 described with reference to FIG. 2 (the gain of the antenna device 600 of FIG. 6 is 8.91 dB, and the gain of the antenna device 200 of FIG. 2 is about 9.72 dB), and has an angle width (3 dB) of 58.8 degrees in the main lobe, which is wider than 49.3 degrees which is the angle width (3 dB) of the antenna device 200 of FIG. 2.

Figure 10:
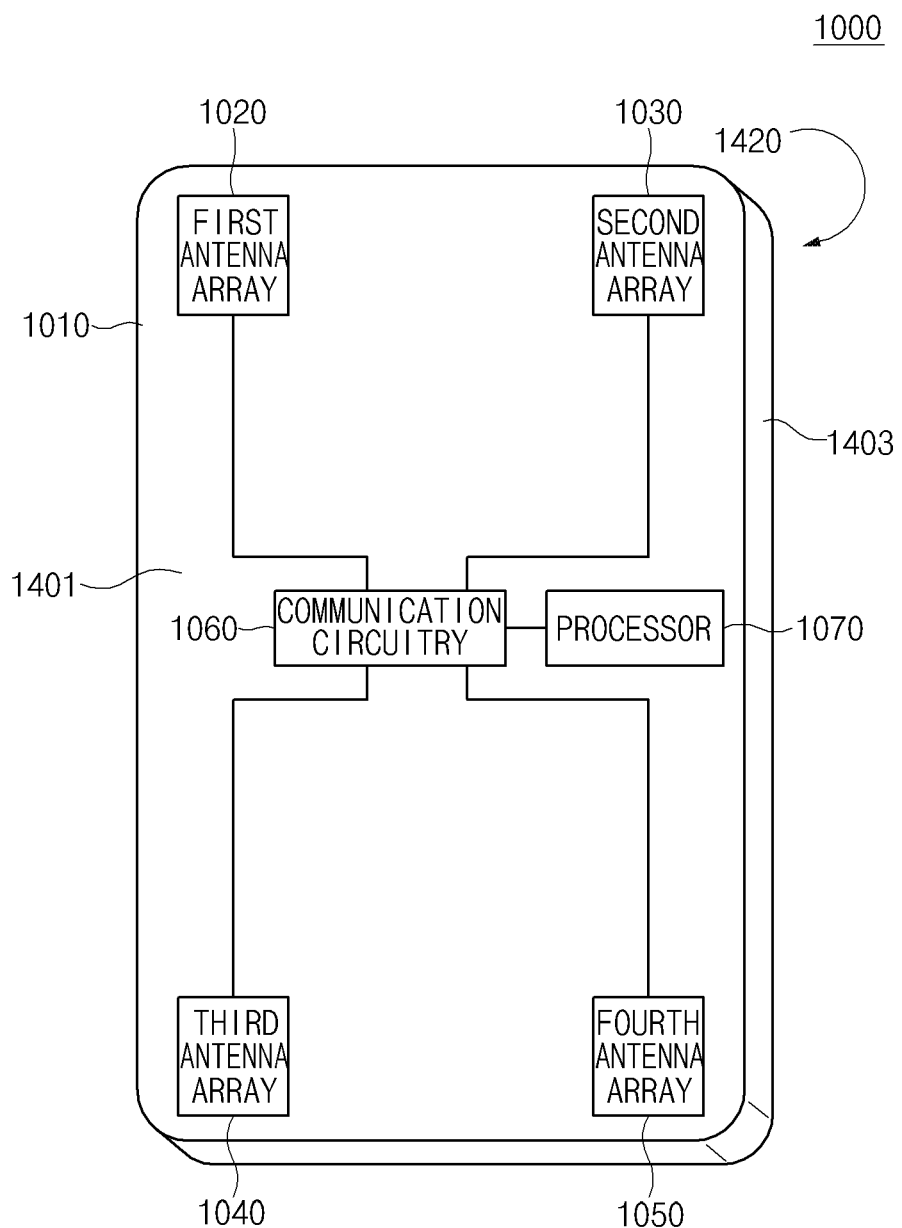
FIG. 10 illustrates an internal structure of an electronic device according to an embodiment.

FIG. 10 illustrates an internal structure of an electronic device according to an embodiment.

Referring to FIG. 10, according to an embodiment, an electronic device 1000 may include a housing 1010, a first antenna array 1020 (or a first communication device or a first antenna device), and a second antenna array 1030 (or a second communication device), a third antenna array 1040 (or a third communication device), and a fourth antenna array 1050 (or a fourth communication device). The electronic device 1000 may be, for example, a mobile terminal.

The housing 1010 may protect other components of the electronic device 1000. The housing 1010 may include, for example, a front plate, a back plate facing away from the front plate, and a side member (or metal frame) attached to the back plate or formed integrally with the back plate to surround the space between the front plate and the back plate.

The first antenna array 1020, the second antenna array 1030, the third antenna array 1040, and the fourth antenna array 1050 may be positioned inside the housing 1010. The first antenna array 1020, the second antenna array 1030, the third antenna array 1040, and the fourth antenna array 1050 may include the antenna devices 200 illustrated in FIG. 2, the antenna devices 400 illustrated in FIG. 4, or the antenna devices 600 illustrated in FIG. 6. According to an embodiment, the first antenna array 1020 may be disposed on the left upper end of the electronic device 1000, the second antenna array 1030 may be disposed on the right upper end of the electronic device 1000, the third antenna array 1040 may be disposed at the left lower end of the electronic device 1000, and the fourth antenna array 1050 may be disposed at the right lower end of the electronic device 1000.

Although not illustrated in FIG. 10, the electronic device 1000 further include a communication circuitry 1060 (e.g. the communication circuitry 470a of FIG. 4) electrically connected with the first antenna array 1020, the second antenna array 1030, the third antenna array 1040, and the fourth antenna array 1050 through power feeding lines. In addition, the electronic device 1000 may further include a processor 1070 associated with the operation of the communication circuitry 1060.

Figure 11:
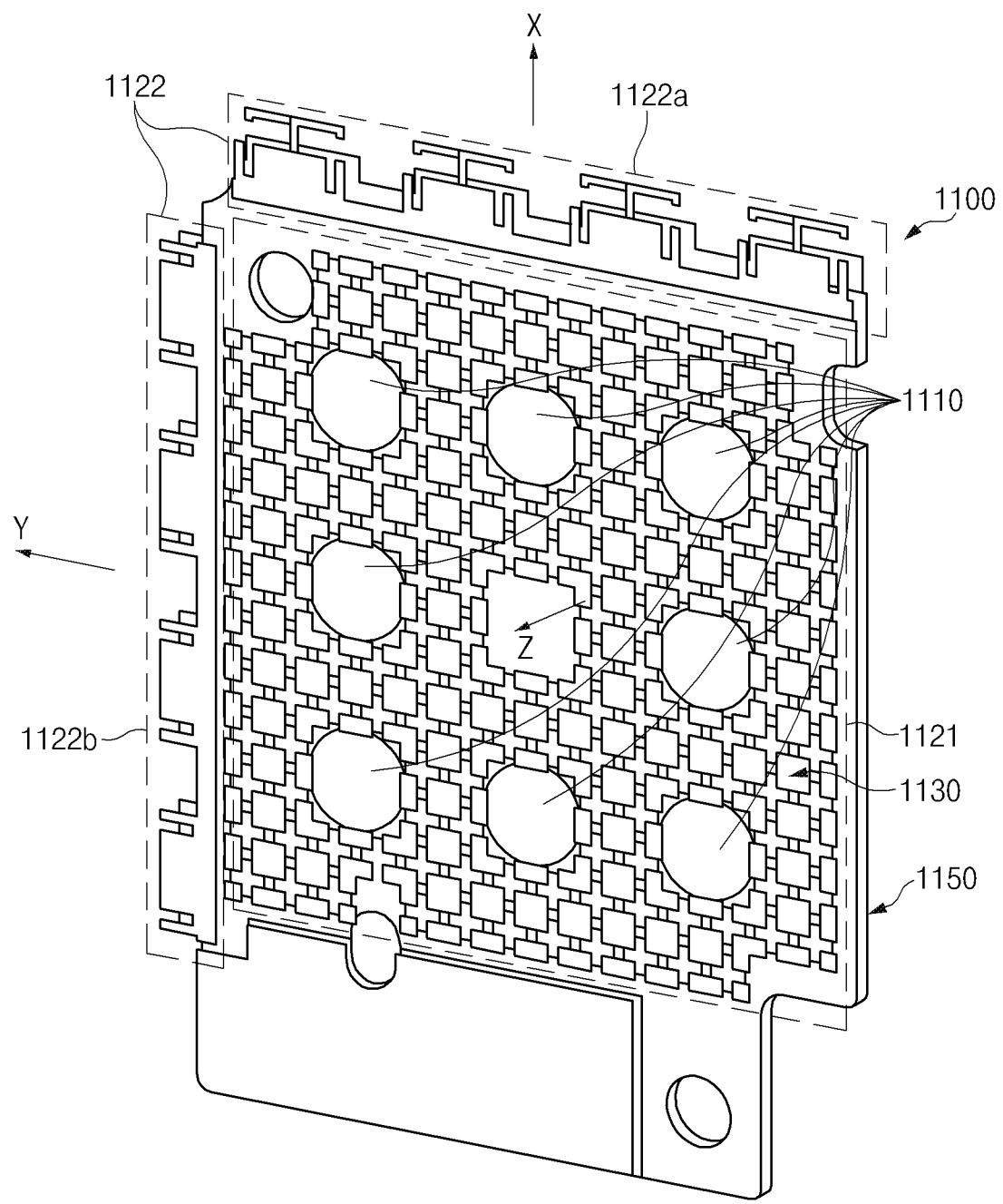
FIG. 11 schematically illustrates a structure of an antenna array included in an electronic device according to an embodiment.

FIG. 11 schematically illustrates a structure of an antenna array included in an electronic device according to an embodiment.

Referring to FIG. 11, according to an embodiment, an antenna device 1100 (or an antenna array or antenna assembly) may include a first directional antenna module 1110 (e.g., a broad-side antenna module) and a second directional antenna module 1122 (e.g., end-fire antenna module). The antenna array illustrated in FIG. 11 may be the first antenna array 1020 illustrated in FIG. 10. The first directional antenna module 1110 may be the antenna device 200 illustrated in FIG. 2 or the antenna device 400 and 600 illustrated in FIG. 4 or 6. The first directional antenna module 1110 may be oriented in the Z-axis direction (or toward the rear surface of the electronic device).

The second directional antenna module 1122 may be disposed adjacent to the first directional antenna module 1110. The second directional antenna module 1122 may be disposed to be adjacent to, for example, a peripheral portion of the electronic device. For example, when the antenna array is disposed at the left upper end of the electronic device, the second directional antenna module 1122 may be disposed to be adjacent to the left end and the upper end of the first directional antenna module 1110.

The antenna array may transmit or receive 5G communication signals of 3 GHz to 100 GHz (or 20 GHz to 80 GHz band, or 28 GHz). The second directional antenna module 1122 may have, for example, a dipole antenna characteristic. According to an embodiment, antenna modules 1122*a* disposed on an upper side of the second directional antenna module 1122 may transmit/receive a signals in a upper direction (or X-axis direction), and the antenna modules 1122*b* disposed on a left side of the second directional antenna module 1122 may transmit/receive a communication signal in a left direction (or Y-axis direction).

In the antenna device 1100 described with reference to FIG. 11, antenna radiators (or the first conductive pattern or the patch antenna, or the broad-side antenna module) 1110 may be arranged in the form of an array. For example, the antenna radiators 1110 may form a 3×3 array (the center area is empty, so a total of 8 antenna radiators are disposed). The antenna radiators 1110 may be disposed on the same plane. The antenna radiators 1110 may be, for example, disposed on one of a plurality of layers included in a substrate 1150. The antenna radiators 1110 may be disposed to be exposed on the outside of the substrate 1150, or may be embedded inside the substrate 1150. Each of the antenna radiators 1110 may be formed in a patch form. Although it is illustrated that each antenna radiator 1110 is provided in the form of a circular patch, the disclosure is not limited. Each of the antenna radiators 1110 may be provided in the form of a rectangular patch or in various forms.

When a plurality of antenna radiators 1110 corresponding to the first directional antenna modules 1110 are provided as described above, the antenna device 1100 may include a plurality of power feeding lines (e.g., the feeding line 440 of FIG. 4) to supply power to the respective antenna radiators 1110. For example, when 8 antenna radiators 1110 of the first directional antenna module 1110 are provided, 8 power feeding lines may be provided. The plurality of power feeding lines may be electrically connected with a communication circuitry (e.g., the communication circuitry 470*a* of FIG. 4), and may feed power to the antenna radiators 1110. In addition, a plurality of power feeding lines to connect dipole type antenna radiators disposed in the second directional antenna module 1122 with the communication circuitry (e.g., the communication circuitry 470*a* of FIG. 4) may be connected through the substrate 1150 of the antenna device 1100.

According to an embodiment, the antenna radiators 1110 may be configured to transmit and receive a signal in a band of about 20 GHz to about 300 GHz. The resonance frequency of the antenna radiators 1110 may be changed depending on at least a portion of the size of each of the antenna radiators 1110, the distance between each of the antenna radiators 1110 and the ground layer, and the distances between the antenna radiators 1110 and a plurality of conductive cells 1130.

Meanwhile, although the above description will be made in that antenna radiators 1110 are arranged at a central portion, in detail, 8 antenna radiators 1110 are arranged around at the center, the disclosure is not limited thereto. For example, a plurality of antenna radiators 1110 (e.g., two, three, four, five, six, or seven antenna radiators) may be arranged to be spaced apart from each other by a specific distance in the vertical direction (or in the horizontal direction). Alternatively, the antenna radiators 1110 are arranged in a specified number (or odd number) in the vertical direction, and may be arranged in a plurality of columns.

Figure 12:
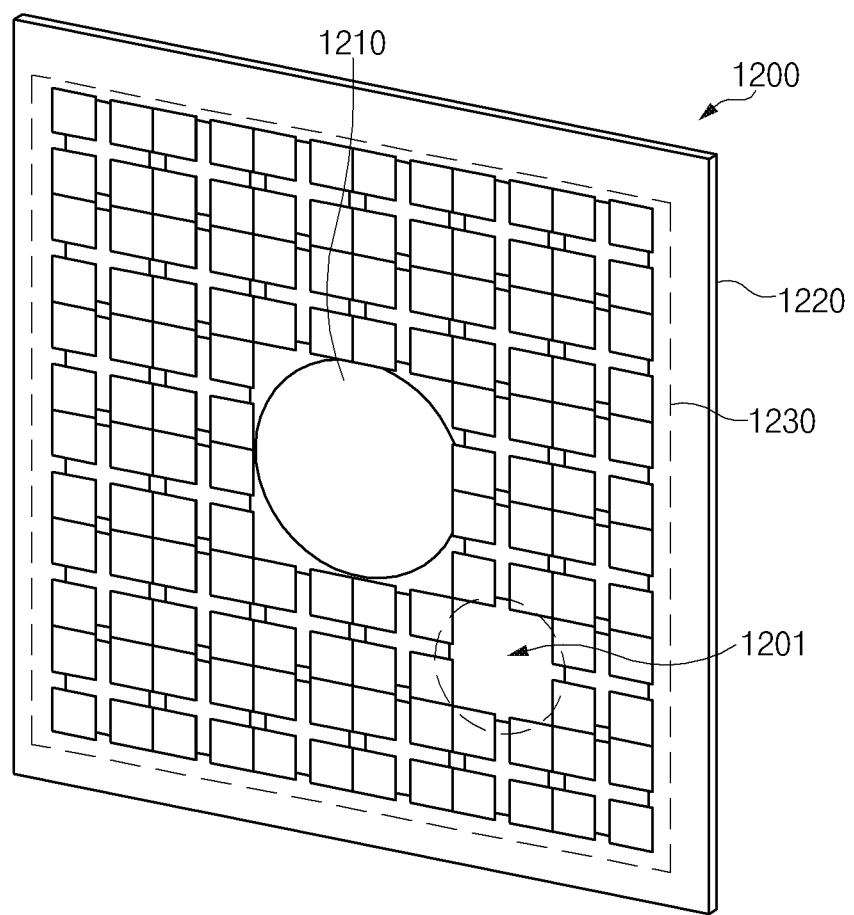
FIG. 12 is a view illustrating some components of an antenna device according to another embodiment of the disclosure.

FIG. 12 is a view illustrating some components of an antenna device according to another embodiment of the disclosure.

Referring to FIG. 12, an antenna device 1200 includes, for example, a ground layer 1220, an antenna radiator 1210, and a plurality of conductive cells 1230 arranged at a plurality of layers in the vertical direction while crossing each other in the vertical direction. In addition, some conductive cells may include an empty area 1201. The plurality of conductive cells 1230 may include a plurality of conductive cell layers arranged to cross each other in the vertical direction.

The empty area 1201 may be provided depending on various mechanical characteristics of the electronic device or the mobile device in which the antenna device 1200 is placed. For example, when the antenna device 1200 are overlapped with other structures (e.g., areas in which a camera and a sensor are disposed) of the mobile device in the vertical direction, the empty area 1201 may be formed. As an additional conductive cell is not provided in the empty area 1201, at least a portion of the ground layer 1220 may be exposed to the outside of the antenna device 1200 or the insulating layer or the dielectric layer formed on the ground layer 1220 may be exposed to the outside of the antenna device 1200.

Figure 13:
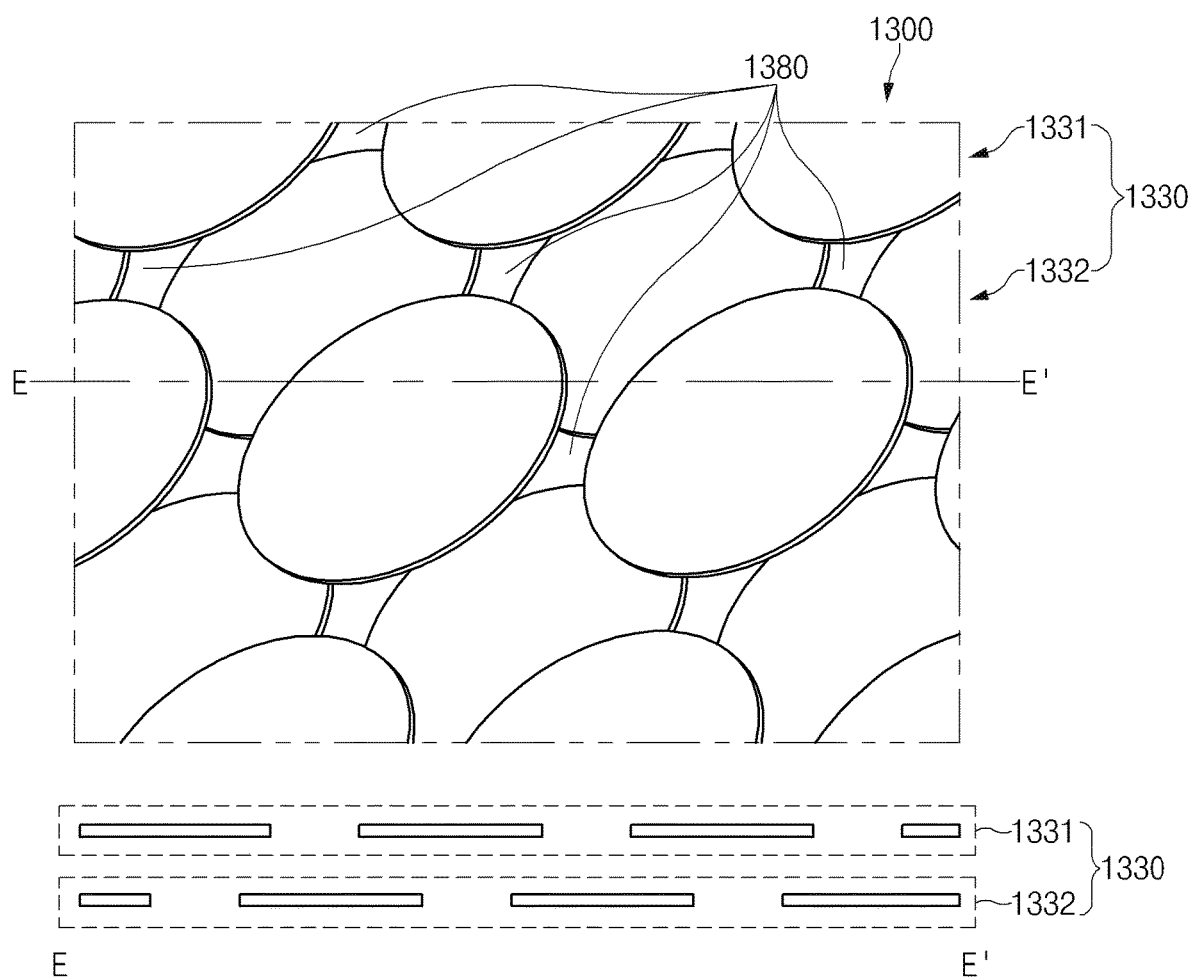
FIG. 13 is a view illustrating another form of a plurality of conductive cells of an antenna device according to an embodiment.

FIG. 13 is a view illustrating another form of a plurality of conductive cells of an antenna device according to an embodiment.

Referring to FIG. 13, an antenna device 1300 may include a plurality of conductive cells 1330. In the plurality of conductive cells 1330, elliptical cells (including a circle having an eccentricity of 0) that form a plurality of layers in the vertical direction while crossing each other in the vertical direction as illustrated in drawings. For example, referring to a cutting line E-E' illustrated in the drawings, the plurality of conductive cells 1330 may include a first cell layer 1331 in which a plurality of elliptical cells are spaced apart from each other by a specific distance in the same layer, and a second cell layer 1332 in which a plurality of elliptical cells are arranged to cross the elliptical cells, which are included in the first cell layer 1331, at the lower portion of the first cell layer 1331 and are spaced apart from each other by a specific distance. As the gap in the first cell layer 1331 is overlapped with the gap in the second cell layer 1332, a plurality of openings 1380 (areas substantially filled with a dielectric material or an insulating material) between the first cell layer 1331 and the second cell layer 1332 may be provided.

A ground layer may be provided at the lower portion of the second cell layer 1332, and an insulating layer or a dielectric layer may be provided between the second cell layer 1332 and the ground layer. The insulating layer or the dielectric layer may be provided in at least one of a space between the first cell layer 1331 and the second cell layer 1332 or an upper portion of the first cell layer 1331.

The plurality of conductive cells (e.g., 230, 630, and 1330) described with reference to FIGS. 2, 4, 6, and 13 may be arranged at specified distances. The plurality of conductive cells may be arranged to form a periodic structure (or repeating pattern). The periodic structure may be, for example, an artificial magnetic conductor (AMC) structure or an electromagnetic bandgap (EBG) structure. The surface of the periodic structure may have a higher impedance. When the electromagnetic wave is reflected from the periodic structure, the phase difference between an incident wave and a reflected wave may be zero. In addition, reflection in the horizontal direction may be suppressed, and reflection in the vertical direction may be enhanced, thereby improving the gain of the antenna devices 200, 400, 600, 1200, and 1300. Each of the plurality of conductive cells may be, for example, formed in a rectangular shape. However, the disclosure is not limited thereto, and the plurality of conductive cells may be provided in various forms.

Figure 14:
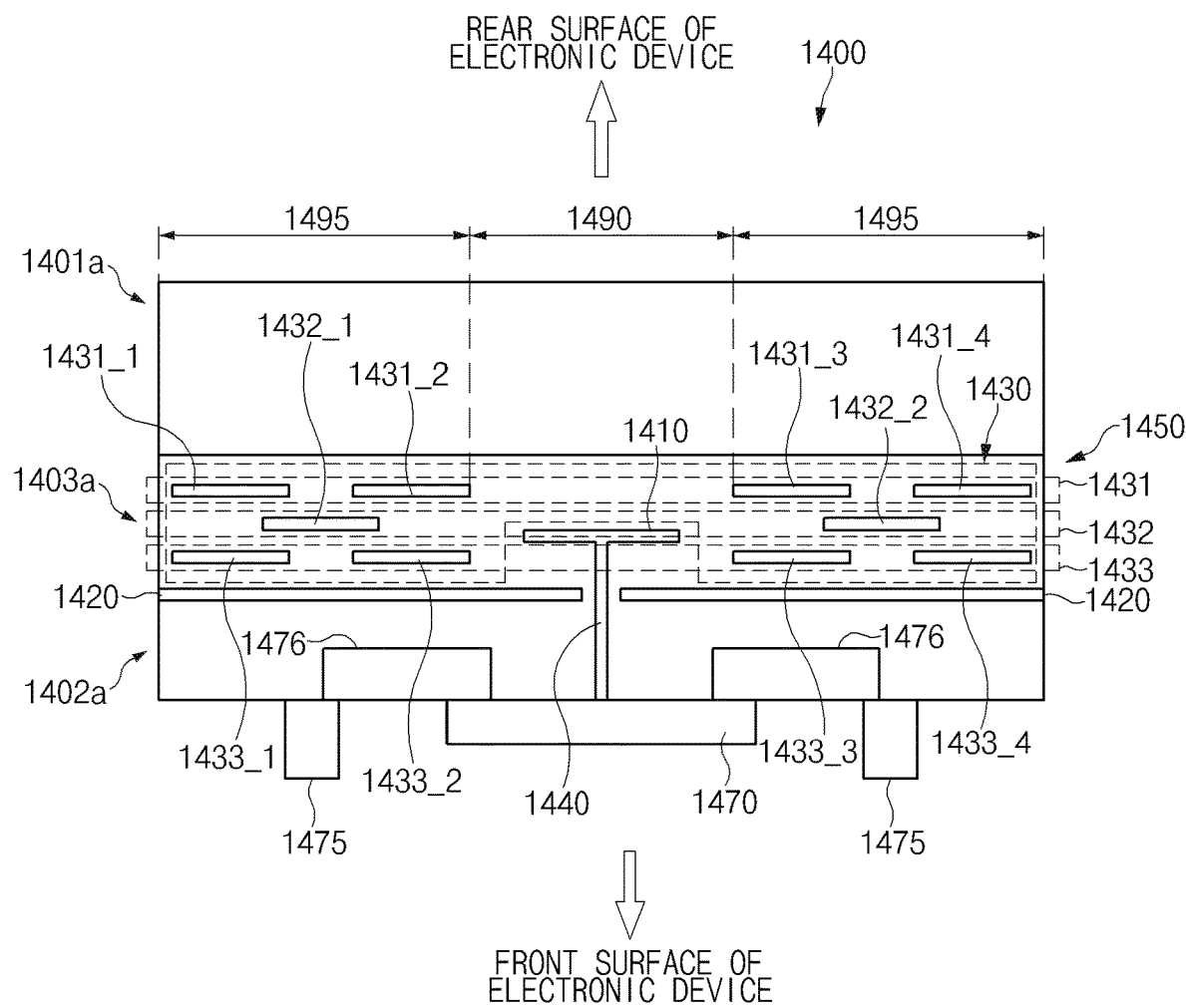
FIG. 14 is another sectional view illustrating an antenna device according to an embodiment.

FIG. 14 is another sectional view illustrating an antenna device according to an embodiment.

Referring to FIG. 14, an electronic device may include a housing (e.g., 1010 of FIG. 10) including a first plate (e.g., 1401 in FIG. 10), a second plate facing away from the first plate (e.g., 1402 in FIG. 10), and a side member (e.g., 1403 of FIG. 10) surrounding a space between the first plate and the second plate, and an antenna device 1400 (or an antenna assembly or an antenna array).

The antenna device 1400 may have a structure in which a substrate 1450 and a communication module (or the communication circuitry) 1470 connected with the substrate 1450 are stacked each other, when viewed from the rear surface (or the back plate or the second plate) of the electronic device. Alternatively, when the first plate (or the front plate) and the second plate (a plate facing away from the first plate; a rear plate) of the housing of the electronic device are provided and a side member is provided to surround the space between the first plate and the second plate, the arrangement structure of the substrate 1450 may be provided in a direction facing the first plate from the second plate. The antenna device 1400 may include a plurality of planes (or layers) disposed in parallel to the second plate of the housing and stacked each other. The plurality of planes may include a first plane (e.g., 1431 of FIG. 14) interposed between the first plate and the second plate, a second plane (e.g., 1432 of FIG. 14) interposed between the first plane and the first plate, and a third plane 1433 interposed between the second plane and the first plate. According to various embodiments, the electronic device includes an electrical member 1475 electrically connected with the communication module 1470, and the electrical member 1475 is electrically connected to the communication module 1470 through a wiring 1476. The wiring 1476 may be disposed in at least one layer in the substrate. Accordingly, the electrical member 1475 may be connected with the communication module 1470 through the wiring disposed in at least one layer of the substrate.

The substrate 1450 may include a first repeating pattern layer (or first repeating plane, or first layer) 1431 having a conducive property and having a plurality of conductive cells 431_1, 1431_2, 1431_3, and 1431_4, which are arranged in a first shape and a first size at specific distances, a second repeating pattern layer (or second repeating plane or second layer) 1432 having a conductive property and having a plurality of conductive cells 1432_1 and 1432_2 which are arranged in a second shape and a second size at specific distances, and a third repeating pattern layer (or third repeating plane or third layer) 1433 having a plurality of conductive cells 433_1, 1433_2, 1433_3, and 1434_4 which are arranged in a third shape and a third size at specific distances, among the plurality of conductive cells 1430.

A conductive plate 1410 corresponding to the antenna radiator may be disposed at the center of the substrate 1450 or a first area 1490 which is surrounded by the repeating pattern layers 1431, 1432, and 1433, and may be connected with a wireless communication circuitry 1470 through a power feeding part 1440. A ground layer 1420 may be disposed at the lower portion of the conductive plate 1410. The ground layer 1420 has a via hole through which the power feeding part 1440 passes. Conductive islands (e.g., the plurality of conductive cells) may be disposed in each repeating pattern layer. At least a portion of a second area 1495, in which the repeating pattern layers 1431, 1432, and 1433 are disposed, may be disposed to surround the first area 1490.

The conductive plate 1410 may be disposed in any one of a position higher than the first repeating pattern layer 1431, the same layer (or layer, or plane) as that of the first repeating pattern layer 1431, a space between the first repeating pattern layer 1431 and the second repeating pattern layer 1432, the same layer as the second repeating pattern layer 1432, a space between the second repeating pattern layer 1432 and the third repeating pattern layer 1433, and a lower portion of the third repeating pattern layer 1433. When the antenna device 1400 includes a plurality of conductive plates (or antenna radiators), the antenna radiators may be disposed in the same layer or disposed in mutually different layers.

As described above, according to various embodiments, an electronic device may include a housing (e.g., 1010 of FIG. 10) including a first plate, a second plate facing away from the first plate, and a side member surrounding a space between the first plate and the second plate, an antenna assembly (e.g., 1020, 1030, 1040, and 1050 of FIG. 10, 1100 of FIG. 11, 1400 of FIG. 14) including a plurality of planes disposed in parallel to the second plate, stacked on each other, and including a first plane (e.g., 1431 of FIG. 14) interposed between the first plate and the second plate, a second plane (e.g., 1432 of FIG. 14) interposed between the first plane and the first plate, and a third plane (e.g., 1433 of FIG. 14) interposed between the second plane and the first plate, a first conductive plate (e.g., 1410 of FIG. 14) disposed in parallel to the planes and interposed between the first plane and the first plate within a first area (e.g., 1490 of FIG. 14) when viewed from above the second plate, conductive islands (e.g., the plurality of conductive cells, 1431_1, 1431_2, 1431_3, and 1431_4) having a first repeating pattern and disposed on the first plane within a second area (e.g., 1495 of FIG. 14) surrounding the first area (e.g., 1490 of FIG. 14), when viewed from above the second plate, conductive islands (e.g., 1432_1 and 1432_2 of FIG. 14) disposed on the second plane within the second area, and having a second repeating pattern partially overlapped with the first repeating pattern, when viewed from above the second plate, conductive islands disposed on the third plane within the second area, and having a third repeating pattern partially overlapped with the second repeating pattern, when viewed from above the second plate, and a wireless communication circuitry (e.g., 1470 of FIG. 14) disposed in the space, electrically connected with the first conductive plate, and configured to supply a signal having a frequency range of 3 GHz to 300 GHz.

According to various embodiments, the first conductive plate may be interposed between the first plane and the third plane.

According to various embodiments, the first conductive plate may be disposed on the second plane.

According to various embodiments, the first conductive plate may be interposed between the second plane and the third plane.

According to various embodiments, the electronic device may further include a display exposed through a portion of the first plate.

According to various embodiments, the first repeating pattern may be substantially overlapped with the third repeating pattern, when viewed from above the second plate.

According to various embodiments, the first to third repeating patterns may have at least one of a circular shape, a square shape, or a rectangular shape.

According to various embodiments, at least a portion of the wireless communication circuitry may be interposed between the third plane and the first plate.

According to various embodiments, an electronic device may include a wireless communication circuitry (e.g., 470a of FIG. 4), an antenna device (e.g., 400 of FIG. 4) to transmit or receive a signal associated with an operation of the wireless communication circuitry. The antenna device may include a ground layer (e.g., 420 of FIG. 4), at least one antenna radiator (e.g., 410 of FIG. 4) disposed at an upper portion of the ground layer, a first cell layer (e.g., 431 of FIG. 4) in which a plurality of conductive cells having a first size and shape are repeatedly disposed, with a specific distance, at a peripheral portion of the at least one antenna radiator, and a second cell layer (e.g., 432 of FIG. 4) in which a plurality of conductive cells having a second size and shape are disposed with a specific distance at a lower portion of the first cell layer and at the peripheral portion of the at least one antenna radiator.

According to various embodiments, the electronic device may further include a power feeding part (e.g., 440 of FIG. 4) electrically connected with the at least one antenna radiator through a hole formed in one side of the ground layer to supply power.

According to various embodiments, the first size and shape may be formed to be the same as the second size and shape.

According to various embodiments, the first size and shape may be formed to be mutually different from the second size and shape.

According to various embodiments, at least a portion of a space between the cells in the first cell layer may be overlapped with at least a portion of a space between the cells in the second cell layer such that the at least a portion of the ground layer is exposed to an outside.

According to various embodiments, the plurality of conductive cells, which are disposed in the first cell layer, have mutually have different sizes and shapes depending on positions.

According to various embodiments, the first cell layer may include cells having a rectangular shape and disposed at an edge of the ground layer, cells having a square shape and disposed at an intermediate portion of a space between the edge of the ground layer and the at least one antenna radiator, and cells having an L shape and disposed at the peripheral portion of the at least one antenna radiator.

According to various embodiments, the plurality of conductive cells disposed in the second cell layer may have the same rectangular shape.

According to various embodiments, the at least one antenna radiator may be disposed on a layer of at least one of a lower portion of the second cell layer, a layer the same as the second cell layer, a space between the first cell layer and the second cell layer, a layer the same as the first cell layer, or an upper portion of the first cell layer.

According to various embodiments, an electronic device may include a wireless communication circuitry (e.g., 470a of FIG. 4), an antenna device (e.g., 400 of FIG. 4) to transmit or receive a signal associated with an operation of the wireless communication circuitry. The antenna device may include a ground layer (e.g., 420 of FIG. 4), at least one antenna radiator (e.g., 410 of FIG. 4) disposed at an upper portion of the ground layer, a first cell layer (e.g., 631 of FIG. 7) in which a plurality of conductive cells having a first size and shape are repeatedly disposed, with a specific distance, at a peripheral portion of the at least one antenna radiator, a second cell layer (e.g., 632 of FIG. 7) in which a plurality of conductive cells having a second size and shape are disposed with a specific distance under the first cell layer and at the peripheral portion of the at least one antenna radiator, a third cell layer (e.g., 633 of FIG. 7) including a plurality of conductive cells disposed at the lower portion of the second cell layer, and a fourth cell layer (e.g., 634 of FIG. 7) including a plurality of conductive cells disposed at a lower portion of the third cell layer.

According to various embodiments, the first cell layer and the third cell layer are formed to be the same as each other in size and shape, and the second cell layer and the fourth cell layer may be formed to be the same as each other in size and shape.

According to various embodiments, the at least one antenna radiator may be disposed in at least one of a lower portion of the fourth cell layer, a layer the same as the fourth cell layer, a space between the fourth cell layer and the third cell layer, and a layer the same as the third cell layer.

The invention claimed is:
1. An electronic device comprising:
a housing including a first plate, a second plate facing away from the first plate, and a side member surrounding a space between the first plate and the second plate;
an antenna assembly including:
a plurality of planes disposed in parallel to the second plate, and stacked on each other, wherein the planes include:
a first plane interposed between the first plate and the second plate;
a second plane interposed between the first plane and the first plate; and
a third plane interposed between the second plane and the first plate;
a first conductive plate disposed in parallel to the planes and interposed between the first plane and the first plate within a first area, when viewed from above the second plate;
conductive islands having a first repeating pattern and disposed on the first plane within a second area surrounding the first area, when viewed from above the second plate;
conductive islands disposed on the second plane within the second area, and having a second repeating pattern partially overlapped with the first repeating pattern, when viewed from above the second plate;

conductive islands disposed on the third plane within the second area, and having a third repeating pattern partially overlapped with the second repeating pattern, when viewed from above the second plate; and a wireless communication circuitry disposed in the space, electrically connected with the first conductive plate, and configured to supply a signal having a frequency range of 3 GHz to 300 GHz.

2. The electronic device of claim 1, wherein the first conductive plate is interposed between the first plane and the third plane.

3. The electronic device of claim 2, wherein the first conductive plate is disposed on the second plane.

4. The electronic device of claim 2, wherein the first conductive plate is interposed between the second plane and the third plane.

5. The electronic device of claim 1, further comprising: a display exposed through a portion of the first plate.

6. The electronic device of claim 1, wherein the first repeating pattern is substantially overlapped with the third repeating pattern, when viewed from above the second plate.

7. The electronic device of claim 1, wherein the first to third repeating patterns have at least one of a circular shape, a square shape, or a rectangular shape.

8. The electronic device of claim 1, wherein at least a portion of the wireless communication circuitry is interposed between the third plane and the first plate.

* * * * *